W. O. GLEESON & J. M. FERRY.
SEWER PIPE.
APPLICATION FILED FEB. 4, 1914.

1,180,641.

Patented Apr. 25, 1916.

Witnesses:
J. K. R. Diffenderffer
J. L. Sailacher

Inventors:
William O. Gleeson
John M. Ferry
By Chapin & Ferguson
Attorney

UNITED STATES PATENT OFFICE.

WILLIAM O. GLEESON, OF BEDFORD, OHIO, AND JOHN M. FERRY, OF BALTIMORE, MARYLAND.

SEWER-PIPE.

1,180,641.  Specification of Letters Patent.  Patented Apr. 25, 1916.

Application filed February 4, 1914. Serial No. 816,476.

*To all whom it may concern:*

Be it known that we, WILLIAM O. GLEESON and JOHN M. FERRY, citizens of the United States, residing at Bedford, in the county of Cuyahoga, State of Ohio, and Baltimore, State of Maryland, respectively, have invented certain new and useful Improvements in Sewer-Pipes, of which the following is a specification.

This invention relates to improvements in concrete sewer pipes or conduits constructed in sections or sectional units, of any desired size and number, which when assembled are permanently secured together to make a sewer or conduit of any desired size and length.

The object of the invention is to provide an improved joint between the pipe sections, each of which said sections are provided with a bell end and a spigot end having a wire, or other metal, webbing projecting therefrom which when the sections are fitted together come in close proximity to each other and are provided with an overlapping piece of similar wire, or other metal, whereby when the joints are filled the concrete will flow through and around said webbing forming a sealed reinforced lock joint.

The invention consists of the novel construction and arrangement of the parts and combination of parts hereinafter more fully set forth in the following specification and pointed out in detail in the appended claim.

Figure 1:
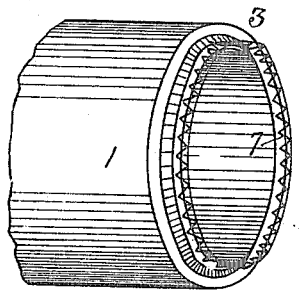
Figure 2:
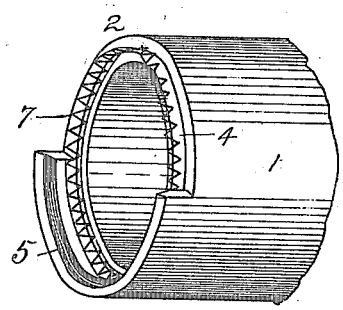
Figure 3:
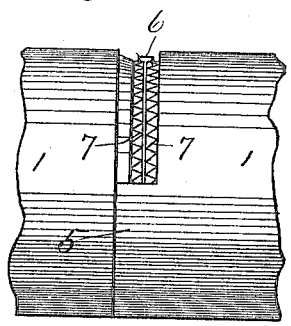
Figure 6:
Figure 4:
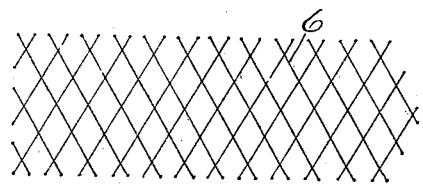
Figure 5:
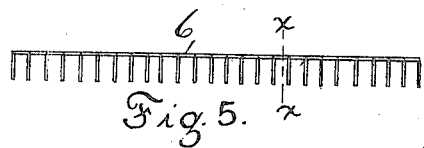

In the accompanying drawings,—Figure 1 is a perspective view of the spigot end of one of the pipe sections. Fig. 2 is a perspective view of the bell end of one of the sections. Fig. 3 is a side elevation of two sections assembled ready to receive the concrete filling. Fig. 4 is a plan view of one of the wire binders. Fig. 5 is a side elevation of Fig. 4, the edge being bent. Fig. 6 is a vertical sectional view on the line $x$—$x$ of Fig. 5.

Referring to the accompanying drawings, forming part of this specification and in which like reference numerals designate like parts throughout the several views thereof, 1 designates a pipe section composed, preferably, of reinforced concrete, and having a bell end 2 and a spigot end 3. The reinforcing fabric, or material, projects from the outer end of the spigot end 3 and from the shoulder 4 of the bell end 2, but within the lip 5 of the said bell end, so that when the sections are fitted together, as shown in Fig. 3, the outer and inner surfaces of each section will be flush with each other and the edges of the reinforcing material will be in close proximity to each other, but not overlapping. Thus it will be seen that the sections may be fitted together without any previous bending of the reinforcing material as is frequently necessary when the reinforcing material overlaps. The lip 5 of the bell end of the sections extends around the lower portion thereof so that when the sections are fitted together the binding fabric, or material 6 may be laid across the upper half of the reinforcing material projecting from the ends of the adjoining sections from the outside, and a similar piece being laid across the lower half from the inside of the sections. These binders 6 are preferably made of woven wire and have their sides bent at right angles and adapted to project through the reinforcing material projecting from the ends of the adjoining sections to hold said binders in position until the concrete is filled into said joint. The joints are filled by pouring the concrete therein in the usual manner, and flows through and around the reinforcing material and the binders thereon and forms a sealed reinforced joint of unusual strength.

Having thus described our invention, what we claim is:

A sectional concrete pipe comprising a number of pipe sections 1 each having a bell end 2 and a spigot end 3, the bell end having a lip 5 which is cut away at the top and having an annular shoulder 4 therein, meshed wire webbing projecting from the outer edge of said shoulder 4, and the spigot end 3 provided with an annular meshed wire webbing the end of which is adapted to come into close proximity to the end of the webbing on the bell and when the sections 1 are fitted together, and an annular meshed wire binder 6 adapted to rest across the said webbing of the adjoining sections and having its sides bent at right angles and adapted to project through the webbing of the adjoining sections to hold it in position while the joint is being poured, whereby when the space between the adjoining sections is filled with concrete a sealed reinforced joint will be formed.

In testimony whereof we affix our signatures in presence of two witnesses.

WILLIAM O. GLEESON.
JOHN M. FERRY.

Witnesses:
CHAFINE A. FERGUSON,
CHARLES E. GARITEE.